United States Patent
Clark et al.

(10) Patent No.: US 9,280,745 B1
(45) Date of Patent: Mar. 8, 2016

(54) ARTIFICIAL INTELLIGENCE EXPERT SYSTEM FOR SCREENING

(71) Applicant: Applied Underwriters, Inc., Omaha, NE (US)

(72) Inventors: David Alan Clark, San Mateo, CA (US); Justin N. Smith, Woodside, CA (US)

(73) Assignee: Applied Underwriters, Inc., Omaha, NE (US)

( * ) Notice: Subject to any disclaimer, the term of this patent is extended or adjusted under 35 U.S.C. 154(b) by 0 days.

(21) Appl. No.: 14/793,841

(22) Filed: Jul. 8, 2015

(51) Int. Cl.
*G06F 15/18* (2006.01)
*G06N 5/04* (2006.01)
*G06N 99/00* (2010.01)

(52) U.S. Cl.
CPC ............... *G06N 5/04* (2013.01); *G06N 99/005* (2013.01)

(58) Field of Classification Search
None
See application file for complete search history.

(56) References Cited

U.S. PATENT DOCUMENTS

| | | | |
|---|---|---|---|
| 5,722,418 A | 3/1998 | Bro | |
| 6,618,734 B1 * | 9/2003 | Williams | G06Q 10/06 707/999.102 |
| 7,062,390 B2 | 6/2006 | Kim et al. | |
| 7,080,057 B2 | 7/2006 | Scarborough et al. | |
| 7,305,304 B2 | 12/2007 | Leyton et al. | |
| 8,095,480 B2 | 1/2012 | Kristal et al. | |
| 8,121,920 B2 | 2/2012 | Liao et al. | |
| 8,359,255 B2 | 1/2013 | Scully | |
| 8,676,717 B2 | 3/2014 | Tigali et al. | |
| 8,700,597 B2 | 4/2014 | Gupta et al. | |
| 8,719,179 B2 | 5/2014 | Bonmassar et al. | |
| 8,818,910 B1 | 8/2014 | Liu et al. | |
| 8,931,058 B2 | 1/2015 | DiChiara et al. | |
| 8,959,035 B2 | 2/2015 | Agrawal | |
| 2002/0055866 A1 * | 5/2002 | Dewar | G06Q 10/063112 705/7.38 |
| 2003/0065554 A1 | 4/2003 | Bataveljic et al. | |
| 2009/0144107 A1 | 6/2009 | Tan | |
| 2009/0187414 A1 | 7/2009 | Haskins et al. | |
| 2011/0055098 A1 | 3/2011 | Stewart | |
| 2013/0006717 A1 * | 1/2013 | Oleson | G06Q 10/06311 705/7.41 |
| 2014/0279689 A1 | 9/2014 | Ng | |
| 2014/0297551 A1 * | 10/2014 | Merrill | G06Q 10/1053 705/321 |

(Continued)

OTHER PUBLICATIONS

Eduardo Barros et al.; Using General Mental Ability and Personality Traits to Predict Job Performance in Three Chilean Organizations; International Journal of Selection and Assessment; Dec. 2014; John Wiley & Sons Ltd.

(Continued)

*Primary Examiner* — Kakali Chaki
*Assistant Examiner* — Luis Sitiriche
(74) *Attorney, Agent, or Firm* — Mark Nowotarski (57) ABSTRACT

An artificial intelligence expert system for screening provides characteristic profiles to candidates to perform a particular task. The profiles have individual screening items within them that are expected to be related to whether or not a person is suitable for the task. The responses from the persons to the items are received by a computer implemented expert system. The expert system applies a combined model to the responses to generate a forecasted performance of the person to the task. The combined model is a linear combination of two or more path dependent regressions performed on data from a set of N training persons with known abilities to do the task. The number of parameters in each path dependent model is limited to a fraction of the number N so that the path dependent models are not over fit to the data. A suitable fraction is ⅕.

6 Claims, 11 Drawing Sheets

(56) References Cited

U.S. PATENT DOCUMENTS

| | | | |
|---|---|---|---|
| 2014/0324521 | A1 | 10/2014 | Mun |
| 2014/0344271 | A1* | 11/2014 | Bartram .................. G06Q 10/10 707/737 |
| 2014/0379555 | A1 | 12/2014 | Erbey et al. |
| 2015/0025928 | A1 | 1/2015 | Kang et al. |
| 2015/0063713 | A1 | 3/2015 | Yang et al. |
| 2015/0066739 | A1 | 3/2015 | Lucas, Jr. et al. |
| 2015/0332169 | A1* | 11/2015 | Bivens .................. G06N 99/005 706/12 |

OTHER PUBLICATIONS

Laura Koppes Bryan et al.; Do Job Applicant Credit Histories Predict Performance Appraisal Ratings or Termination Decisions?; The Psychologist Manager; Routledge; May 3, 2012; http://dx.doi.org/10.1080/10887156.2012.676883.

Caliper Profile; 2001; Caliper Corporation.

Caliper Glossary of Terms; Personality Attributes; 2013; Caliper Management.

Caliper Profile User's Guide, Copyright 2001.

Derek S. Chapman et al.; The Use of Technologies in the Recruiting, Screening, and Selection Processes for Job Candidates; Blackwell Publishing Ltd.; International Journal of Selection and Assessement; vol. 11 Nos. 2/3; Jun./Sep. 2003.

Colleen Parker Denston; Government Affairs Director Maryland; Society of Human Resource Management; Presented to the Senate Finance Committee, Feb. 25, 2010.

Experian Government Services; Employment Insight; Experian Information Solutions, Inc. 2010.

Wikipedia; Artificial neural network; last viewed May 7, 2015; https://en.wikipedia.org/wiki/Artificial_neural_network.

Wikipedia; Pearson product-moment correlation coefficient; last viewed May 7, 2015; https://en.wikipedia.org/wiki/Pearson_product-moment_correlation_coefficient.

Wikipedia; R (programming language); last viewed Jun. 11, 2015; https://en.wikipedia.org/wiki/R_(programming_language).

Wikipeda; SAS (software); last viewed Jun. 11, 2015; https://en.wikipedia.org/wiki/SAS_(software).

Wikipedia; SPS; last viewed Jun. 11, 2015; https://en.wikipedia.org/wiki/SPSS.

Wikipedia; Coefficient of determination; last viewed Dec. 9, 2014; https://en.wikipedia.org/wiki/Coefficient_of_determination.

Wikipedia; Credit Limit; last view Dec. 9, 2014; https://en.wikipedia.org/wiki/Credit_limit.

Wikipedia; Stepwise regression; last viewed Mar. 6, 2015; https://en.wikipedia.org/wiki/Stepwise_regression.

Wikipedia; Personality test; last viewed Jun. 22, 2015; https://en.wikipedia.org/wiki/Personality_test.

* cited by examiner

ARTIFICIAL INTELLIGENCE EXPERT SYSTEM FOR SCREENING

COPYRIGHT AND TRADEMARK NOTICE

A portion of the disclosure of this patent document contains material to which a claim for copyright is made. The copyright owner has no objection to the facsimile reproduction by anyone of the patent document or the patent disclosure, as it appears in the Patent and Trademark Office patent file or records, but reserves all other copyright rights whatsoever.

FIELD OF THE INVENTION

Embodiments of the present invention relate to artificial intelligence expert systems for screening.

BACKGROUND OF THE INVENTION

Figure 1A:
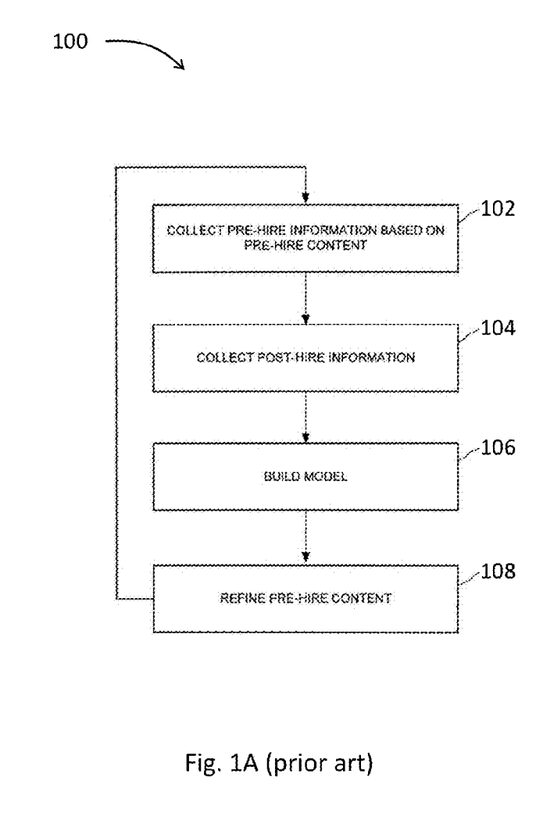
FIG. 1A is a flow chart 100 of a prior art method for developing an artificial intelligence expert system for screening candidates for a task.
Figure 1B:
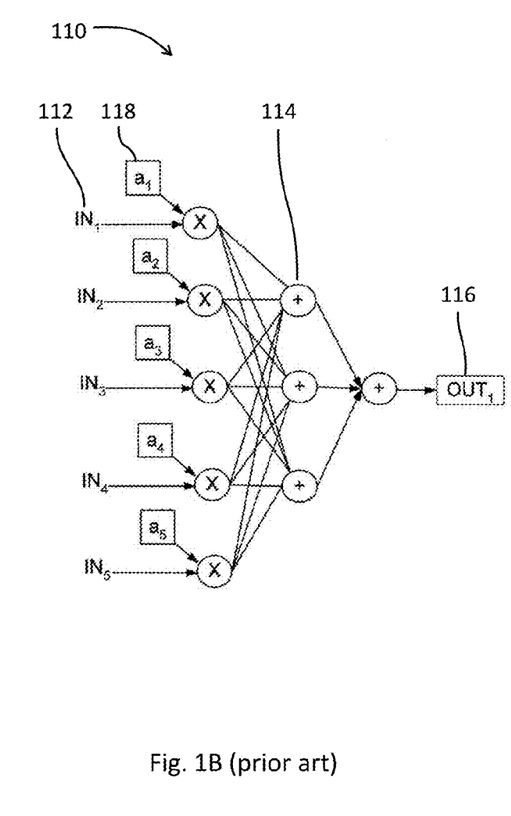
FIG. 1B is an illustration of a neural net model generated by the prior art process of FIG. 1.

It is difficult to develop artificial intelligence expert systems for screening. FIG. 1A is a flow chart 100 of a prior art method for developing an artificial intelligence expert system for screening candidates for employment. It is based on FIG. 5 of U.S. Pat. No. 7,080,057 "Electronic Employee Selection Systems and Methods" (Scarborough). The method comprises collecting pre-hire information 102, collecting post-hire information 104, and building a model 106. The method then refines pre-hire content 108 and repeats the steps. FIG. 1B is an illustration of a neural net model 110 generated by this process. FIG. 1B is based on FIG. 10 of Scarborough. The neural net comprises input items 112, weights for said input items 118, hidden layer nodes 114 and an output 116.

One of the drawbacks of the Scarborough expert system is that it requires large quantities of high quality pre-hire and post-hire data that have to be collected over a long period of time. This is primarily due to the large number of parameters in neural nets that have to be calculated using the data. The weights for each input item, for example, need to be calculated as well as the weights for each neural net node. In example 35 of Scarborough, 2084 complete employment records collected over a year and a half were required to calculate said weights. Even then, the model was still subject to over-training. The Scarborough expert system, therefore, will not work for smaller organizations that might have only 100 persons or less in a given task function. There isn't enough data from current persons in these small organizations to calculate the parameters in the model without overtraining. There is need, therefore, for an artificial intelligence expert system for screening that can be developed with data from only a small number of current persons in a given task function.

SUMMARY OF THE INVENTION

The summary of the invention is provided as a guide to understanding the invention. It does not necessarily describe the most generic embodiment of the invention or the broadest range of alternative embodiments.

Figure 2:
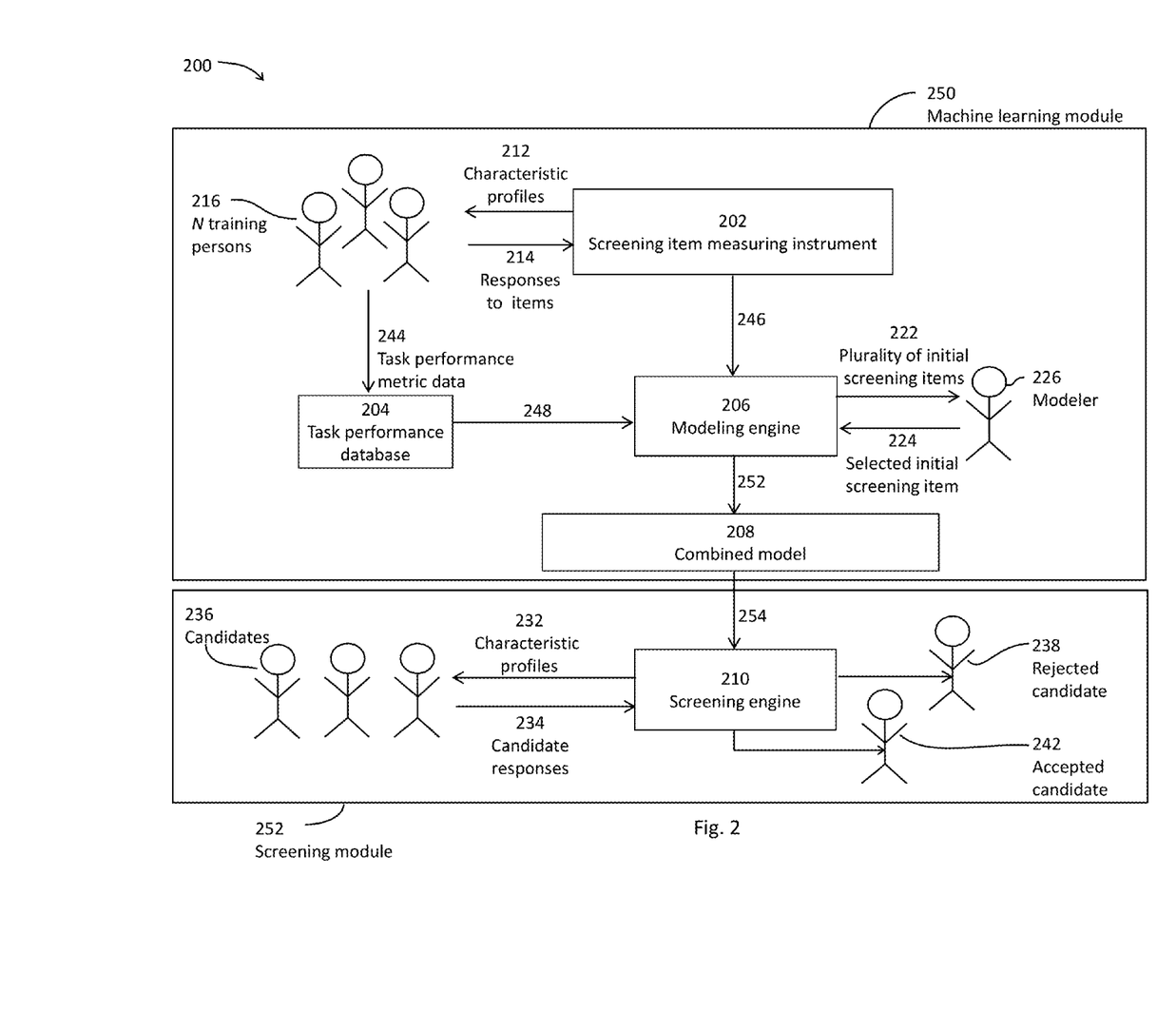
FIG. 2 illustrates an artificial intelligence expert system for screening task candidates for a task function.

FIG. 2 illustrates an artificial intelligence expert system 200 for screening candidates for a task function. The system comprise a machine learning module 250 for developing a model of expected task performance of a candidate for a task function and a screening module 252 for using the model to screen candidates. The learning module only requires data from a relatively small number of training persons 216 in a given task function in order to develop a model 208 for screening candidates 236 for said task function. The system comprises a computer implemented screening item measuring instrument 202, a task performance database 204, a computer implemented modeling engine 206 and a computer implemented screening engine 210. The measuring instrument, modeling engine and screening engine each comprise a human readable output device for presenting information to a person and a human operable input device for receiving input from a person. Output devices include screens, printers, and speakers. Input devices include keyboards, computer mice, eye scanning equipment, gesture recognition equipment and microphones. These examples are not exhaustive. The elements in said system may be combined into a single system or alternatively divided among a plurality of systems.

Machine Learning Module

The screening model is developed through the machine learning module 250 by providing one or more characteristic profiles 212 to a set of N training persons 216 in a given task function. N is the number of said training persons. The provision of the characteristic profiles is through the measuring instrument output device. Characteristic profiles comprise screening items that potentially have some bearing on the ability of a person to perform a task function. Characteristic profiles can also comprise non-screening items which are not used in the modeling. Characteristics that the profiles measure include broad aspects of a person such as behavior, personality and reasoning. As used herein, "items" are individual measures of some aspect of a characteristic. An example of a characteristic profile for the behavior of a person is a credit report for said person. An example of an item in a credit report is the number of tradelines a person has. An example of a characteristic profile for the personality of a person is a personality test. Personality tests are described in the Wikipedia article "Personality test" dated 22 Jun. 2015. Said Wikipedia article is incorporated herein by reference. An example of an item from a personality test would be a person's level of agreement or disagreement with a statement of belief. Other examples of characteristic profiles and their associated items are discussed with reference to FIGS. 4-6.

After the characteristic profiles are presented to the training persons, the measuring instrument then reads in responses 214 to the items in the characteristic profiles through the measuring instrument input device. In the case of a credit report, the measuring instrument might include the systems in a credit agency that collects transaction data regarding an individual. In the case of a personality profile, the measuring instrument might include the systems giving the profile to an individual and then collecting said individual's responses.

Task performance metric data is also collected 244 from the set of N training persons. If the task function of the persons includes sales, then the performance metric might include the number of completed sales during a given time period, such as monthly. The task performance metric data is then stored in the task performance database 204. As used herein, a task performance metric is a quantitative measure of how well a person performs a task function.

The modeling engine then reads in 246 the responses from the N training persons and reads in 248 the task performance metric data and fits two or more path dependent models to the data. A "path dependent model" is a model whose final form depends upon how it is initiated. A forward stepwise regression is an example of a path dependent model. In a forward stepwise regression, an output variable, such as task performance metric, is first fit to a screening item which has a significant effect on the output variable. For example, the task performance metric might be sales performance and a screening item that has a significant effect might be tradelines. The modeling engine then selects an additional screening item that has an impact on the output variable over and above that of the first item. An example of an additional item might be a personality item from a personality test. The model continues to add items that provide incremental improvements to the model until a preset limit M is reached on the number of parameters in the model. The preset limit might be a fraction 1/E of the number of N training persons. A suitable value for E is 5 or greater. If N is 20, for example, and E is 5, then the number of parameters in the model is limited to N/E=4. If the model is a linear model with each screening item having one multiplier as its parameter and an additional parameter is a constant, then the total number of screening items in the forward stepwise regression is limited to M−1 or 3. This is an exceptionally small number of screening items relative to the prior art which might have 50 or more screening items in a neural net model. The degree of effectiveness of this approach of strictly limiting the number of parameters in a machine learning model will be discussed in more detail with respect to FIGS. 9 and 10.

In a forward stepwise regression, there may be more than one screening item that can be used to start the process. If a different screening item is selected as the starting item for a second run of the forward stepwise regression, then the forward stepwise regression might select different subsequent screening items or different weights for the screening items as the model is built. The screening items selected by a first run of a path dependent model is termed the first subset of screening items. The screening items selected by the second run of a path dependent model is termed the second subset of screening items, and so on. Thus the forward stepwise regression can produce more than one model using more than one subset of screening items from the same set of data and same total set of available screening items.

After multiple path dependent models are produced, the models may be combined 252 into a combined model 208. The combination may be a linear combination, logarithmic combination or any other suitable combining method. Combining different path dependent models produced by the same data is important when the screening items are relatively coarse. As used herein, a "coarse screening item" is one that has 10 or less discrete quantified values. A screening item from a personality test, for example, might have only 3 possible values over its domain (e.g. "agree", "disagree", "not sure"). These can be quantified as values −1, 0, and 1 respectively. This coarseness can produce a large scatter in the model output which cannot be reduced by simply increasing the amount of data used to produce the model (e.g. increase the number of N training persons). One of the advantages of combining different models built with different coarse screening items is that the combination is much more effective at reducing scatter in the output than simply increasing the number of N training persons.

In order to select the starting point for each path dependent model, the modeling engine may present 222 a plurality of initial screening items to a modeler 226. The modeler may then select an initial screening item for each of the path dependent models 224. The modeler may also select different types of path dependent models, such as a forward stepwise regression, a backward stepwise regression or a bidirectional stepwise regression. Any type of linear or nonlinear path dependent model may be fit to the data provided the number of parameters in each model is limited to M.

Screening Module

Once the combined model 208 is developed, then the screening engine 210 may read it in 254 and use it to screen candidates 236 for said task function. A candidate is presented 232 with the characteristic profiles used to generate the model through the screening engine output device. The screening engine then receives the candidate's responses 234 to the items in the characteristic profiles through the screening engine input device. The screening engine then executes the model using the candidate's responses to generate a projected task performance metric for the candidate. If the projected task performance metric is less than a minimum threshold task performance metric, then the candidate is rejected 238 for the task function. If the projected task performance metric is above the minimum, the candidate is accepted 242 for at least further evaluation for assignment to the task.

DETAILED DESCRIPTION

The detailed description describes non-limiting exemplary embodiments. Any individual features may be combined with other features as required by different applications for at least the benefits described herein.

As used herein, the term "about" means plus or minus 10% of a given value unless specifically indicated otherwise.

As used herein, a "computer-based system", "computer implemented instrument", "computer implemented engine" or the like comprises an input device for receiving data, an output device for outputting data in tangible form (e.g. printing or displaying on a computer screen), a permanent memory for storing data as well as computer code, and a microprocessor for executing computer code wherein said computer code resident in said permanent memory will physically cause said microprocessor to read-in data via said input device, process said data within said microprocessor and output said processed data via said output device.

Flowchart of Modeling Algorithm

Figure 3:
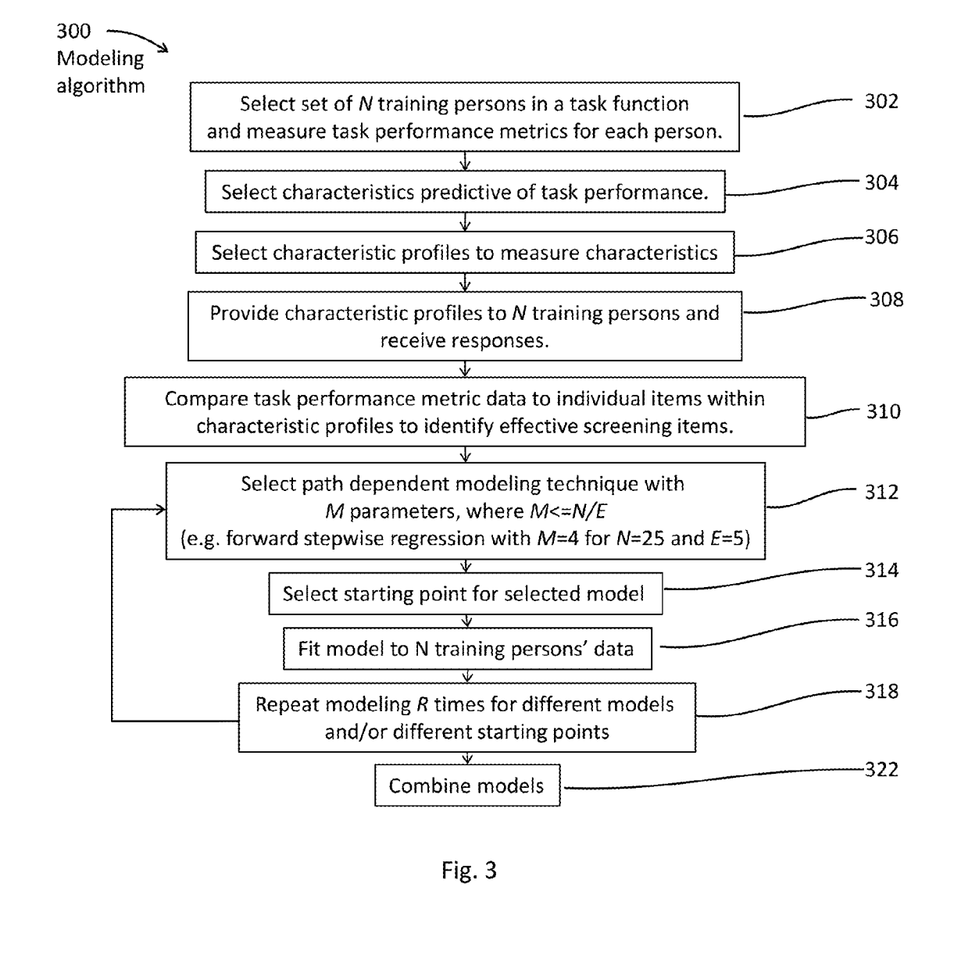
FIG. 3 is a flow chart of a computer implemented method for generating a combined model for screening candidates for a task function.

FIG. 3 is a flow chart of a computer implemented method 300 for generating a combined model for screening candidates for a given task function. By "task function" it is meant a particular key measurable output of a person in a task. The task function is measurable by a task performance metric.

The number of persons in a given organization with the same task function may be relatively small, such as in the range of 10 to 100. Nonetheless, the method described in FIG. 3 is suitable for developing a combined model for screening future candidates for said task function.

The process for creating the combined model begins with selecting a set of N training persons 302 with the same task function and measuring an appropriate task performance metric for each person. The persons may have a distribution of tenure with some engaged in the task for a short time and others engaged in the task for a longer time. The task performance metric data for each person can be weighted according to tenure. Different persons may have different fractions of their time allocated to a given task function. One person may spend 50% of his/her time performing a task function and another may spend 80% of his/her time performing said task function. The task performance metrics for each person, therefore, may be normalized according to the fraction of each person's time allocated to the task function.

A selection is then made 304 of characteristics that might be predictive of task performance. The selection can be made by a modeler based on observations of the persons. The modeler may select the characteristics of behavior, personality, reasoning ability or any other characteristic that might be related to task function performance. The modeler might observe, for example, that successful persons in a given task have the personality trait of "insensitivity to rejection". The modeler would then select personality as a characteristic to be measured. Similarly, the modeler might observe that many persons selected for a task fail to make it through an initial training program since they find it too confusing. The modeler would then select reasoning ability as a characteristic to be measured.

Figure 4:
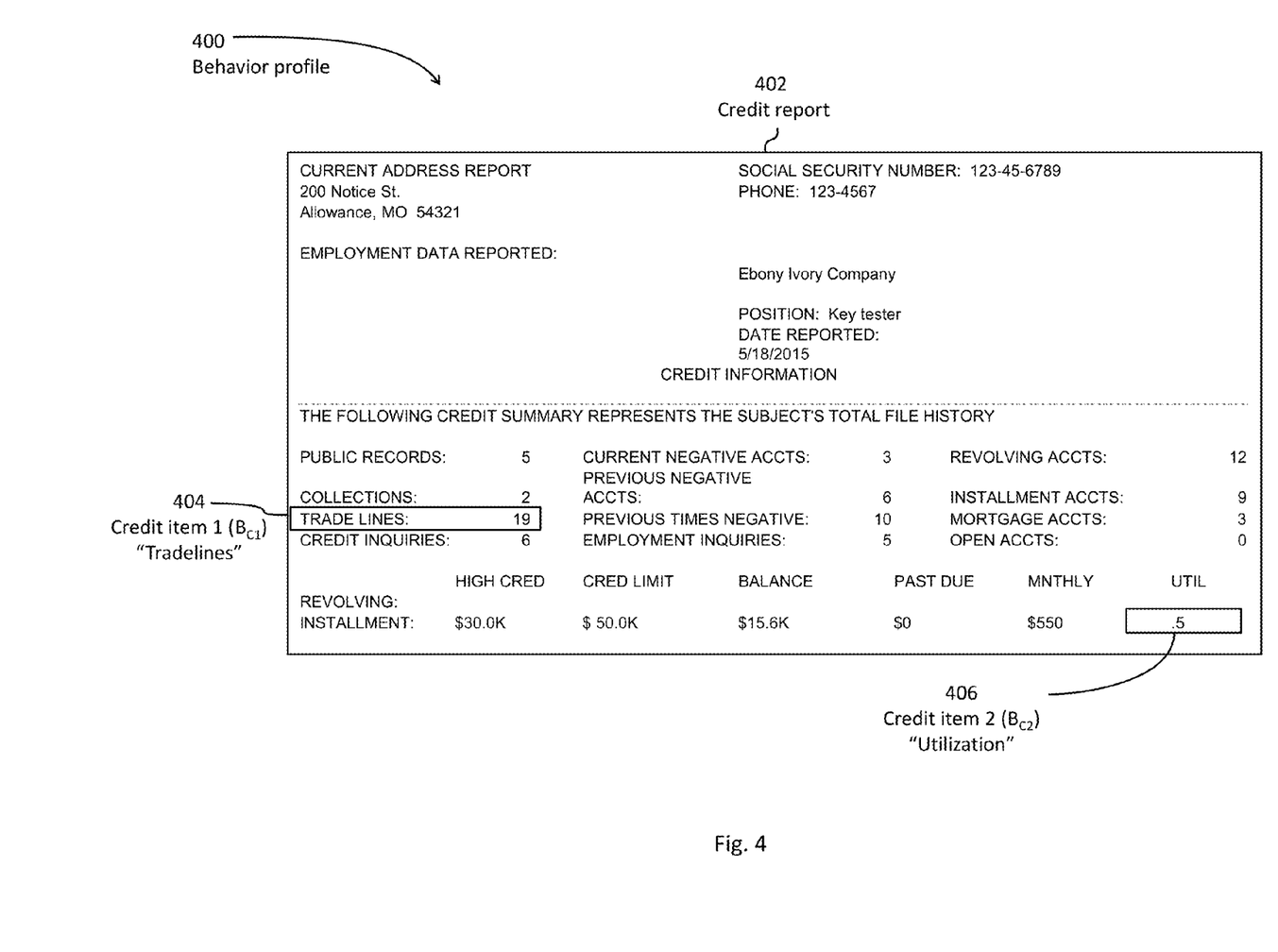
FIG. 4 shows an example of a behavior profile.

Characteristics can be measured by profiles. Profiles comprise a plurality of items indicative of a characteristic. FIG. 4 shows an example of a behavior profile 400. The example is an excerpt from a hypothetical credit report 402. A credit report comprises numerous items indicative of a person's credit behavior. These items include number of tradelines 404 and credit utilization 406. Other behavior profiles may be used, such as driving records.

Figure 5:
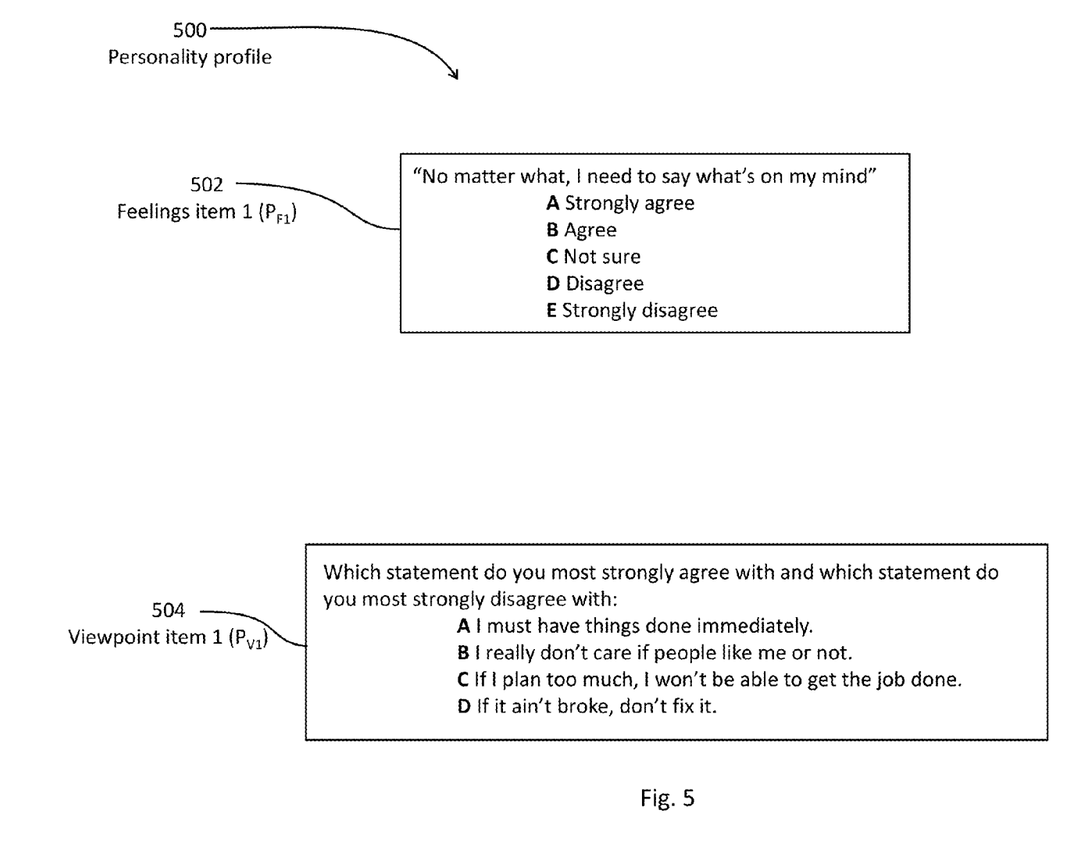
FIG. 5 shows two hypothetical items from a personality profile.

FIG. 5 shows an example of two hypothetical items from a personality profile 500. A personality profile often comprises written items to which a person is asked to respond. The responses to the different items are interpreted to measure aspects of a person's personality. Item 502 is a feelings item. As used herein, a feelings item is a statement which a person is asked to indicate the extent to which said statement captures how said person feels. Item 504 is a viewpoint item. As used herein, a viewpoint item asks a person a question to determine to what extent said person agrees or disagrees with a particular point of view. The viewpoint item 504 asks a person to pick a statement they most strongly agree with and another item they most strongly disagree with.

The response to a feeling item can be converted into a discrete number by assigning a numerical value to each degree of response. For example, "Strongly agree"=1, "Agree"=2, "Mildly agree"=3, "Mildly Disagree"=4, "Disagree"=5 and "Strongly disagree"=6. These numerical values can be used in statistical correlations. The response to a viewpoint item can be converted into a discrete number by selecting a statement of interest (e.g. "I must have things done immediately") and assigning a value of 1 if a response indicates that a person most strongly agrees with it, a value of 0 if the person does not indicate either strong agreement or strong disagreement, and a value of −1 if the person indicates they most strongly disagree with it.

Figure 6:
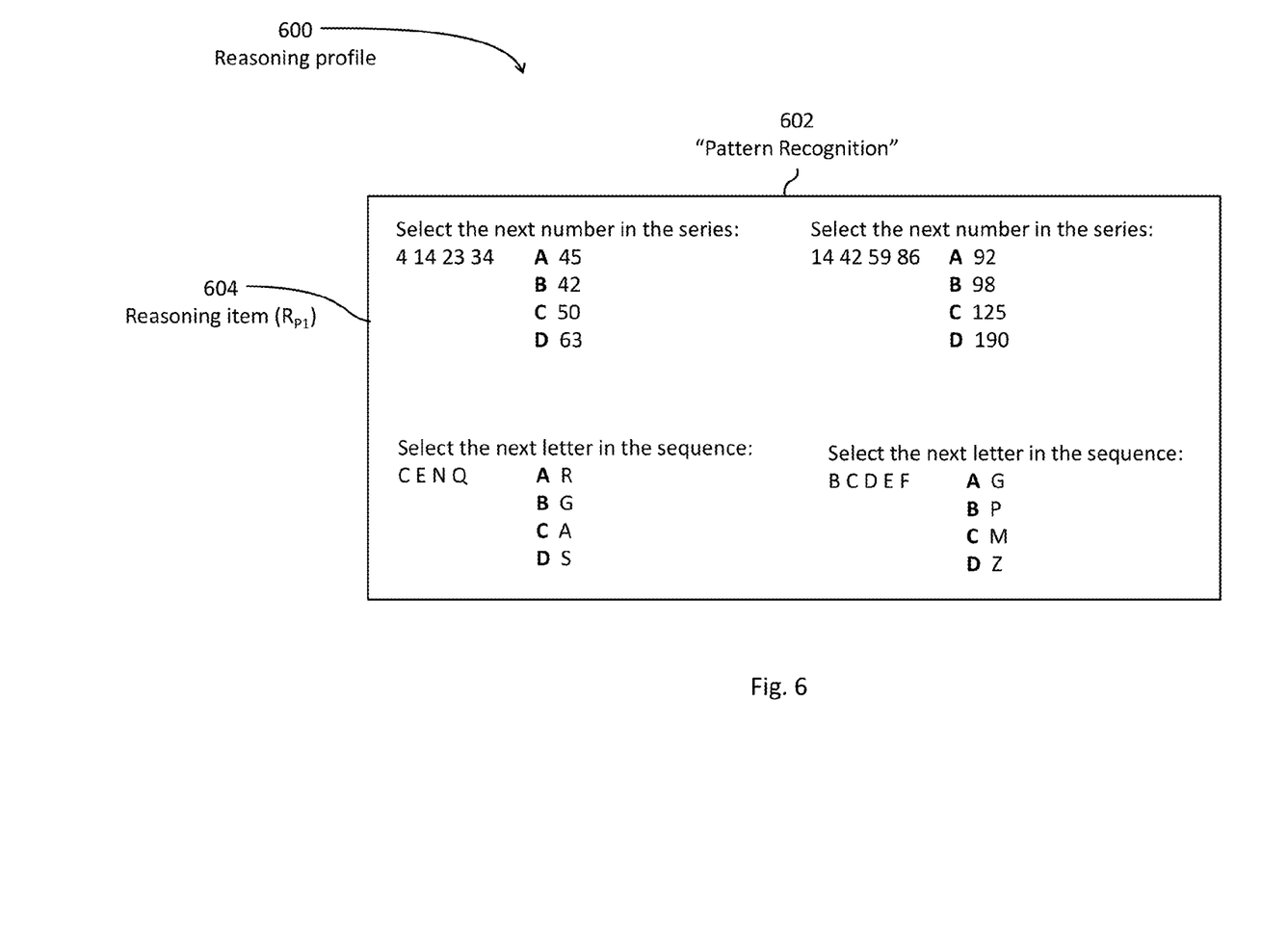
FIG. 6 shows a set of questions that are a series item from a reasoning profile.

FIG. 6 shows a set of questions that collectively are a reasoning item 604 from a reasoning profile 600. The types of questions are pattern recognition 602. A person is asked to pick the answer that best continues the series. The responses to the questions in the reasoning item can be converted to a discrete number by counting the number of correct answers. Different combinations of pattern recognition questions can be evaluated as potential individual screening items.

Referring back to FIG. 3, once characteristics predictive of task performance are selected 304, appropriate characteristic profiles are selected to measure the characteristics 306. The profiles are presented to the N training persons and responses from the persons are then received 308. Characteristic profiles prepared by third parties may be received from said third parties as opposed to directly from the training persons. As used herein, however, the items in a characteristic profile prepared by a third party are still considered to be "responses" from a person.

The task performance metric data and responses to items in the characteristic profiles are then read in by a modeling engine and a comparison 310 is made between one or more of the individual items in a person's characteristic profiles and said person's task performance metric data. The modeling engine then determines which individual items appear to be effective in correlating to task performance. If an item is effective, it is characterized as a "screening item". If it is not effective, it is characterized as a "non-screening item". An item may be considered effective if a linear correlation between the task performance metrics of the N training persons with a given task function and the values of a given item in said N training persons' characteristic profiles show an effect of at least 10% of the total range of task performance metric for the N training persons over the domain of the N training persons' item responses. This is illustrated in FIGS. 7A and 7B.

Figure 7A:
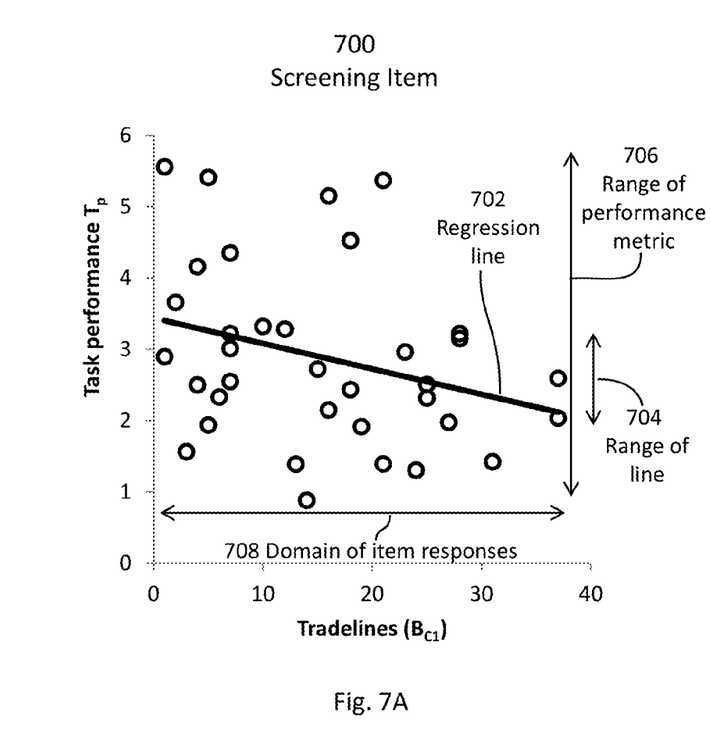
FIG. 7A shows a graph of a task performance metric versus an effective screening item.

FIG. 7A shows graph 700 of the task performance metric $T_p$ versus the behavior item "Tradelines ($B_{C1}$)". Data is shown for 35 people in a given organization. A linear regression line 702 is fit to the data. The regression line has a range 704 of about 1 over the domain 708 of the N training persons' tradelines. The range of the task performance metric 706 is about 5. Thus the linear regression shows an effect of about ⅕ or 20% over the N training persons' domain of tradelines. 10% is considered to be the minimum effect necessary for an item to be a screening item. Thus tradelines is considered indicative of task performance and is characterized as a screening item. Higher or lower values for minimum necessary effect, such as 5% or 20% may be used. A modeler may also designate items to be screening items based on the modeler's judgment.

Figure 7B:
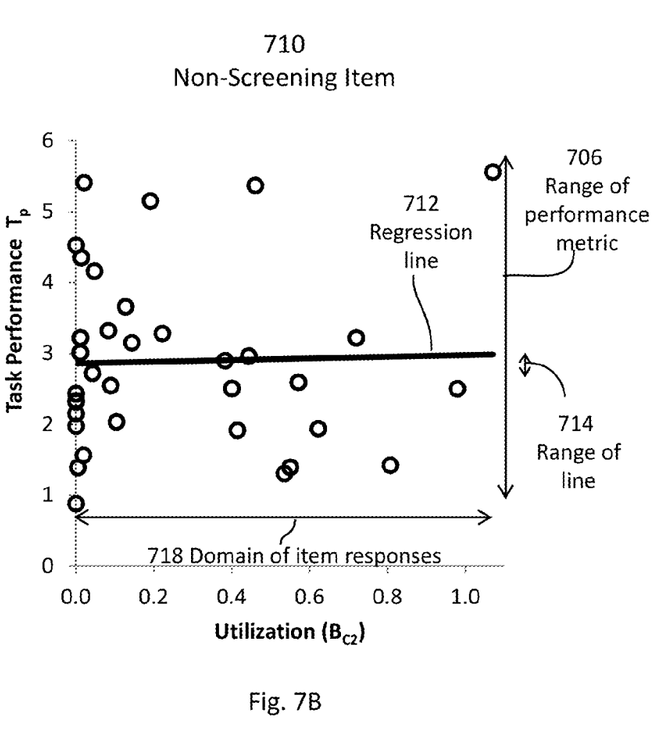
FIG. 7B shows a graph of a task performance metric versus an ineffective non-screening item.

FIG. 7B shows a similar graph 710 for task performance versus a behavior item "Utilization ($B_{C1}$)". The range 714 of the regression line 712 is only about 0.2 over the domain 718 of the N training persons' utilizations. This is 0.2/5 or 4% of the range 706 of task performance metric. This is less than 10%. Utilization, therefore, is characterized as a non-screening item. Similar linear fits can be done for any other items in the characteristic profiles to identify items that can be designated as screening items and therefore used to build the models.

The linear correlations of task performance and screening items may not necessarily be statistically significant. A surprising benefit of the methods described herein is that effective combined models for screening task candidates are developed even when none of the individual items in the characteristic profiles by themselves show a statistically significant correlation to the task performance metric.

The non-screening items have also been shown to have surprising utility even though they are not explicitly used in the model. By providing persons with characteristic profiles comprising both screening items and non-screening items, the responses to the screening items are found to be more accurate. While not wishing to be held to the explanation, it is believed that by presenting training persons with screening items embedded in a set of non-screening items, said persons provide more consistent responses to the screening items. Similarly, when candidates for a task function are presented with screening items embedded in a set of non-screening items, their responses are more consistent as well.

Referring again back to FIG. 3, after effective screening items are identified 310, a path dependent modeling technique is selected 312. This may be done automatically or a modeler. The number of the parameters M in the model is limited to a fraction 1/E of the number N of training persons that provided responses to the characteristic profiles (i.e. M<=N/E). It has been found by experiment that a value for E of 5 or greater is suitable. Thus there are at least 5 data points per model parameter. This reduces over fitting of the model to the data.

After the modeling technique is selected 312, a starting point for the model is selected 314. This may be automatic or by a modeler. The selection may be automated by starting with the most effective screening item for the first run of creating a path dependent model and the second most effective screening item for the second run of creating a path dependent model.

The path dependent model is then fit to the task performance metric data and screening item responses 316. Suitable software for fitting models to the data include IBM® SPSS®, R programming language, and SAS software. The modeling step is then repeated R times 318 for different models and/or different starting points. A suitable value for R is 3 or more.

After the individual models are generated they are combined 322. The combination may be a simple averaging or a weighted linear combination based on minimizing the errors between the combined model output and the task performance metric data.

Once the combined model is developed, it can be used as a screening tool for candidates for the task function. The output of the model is considered a forecast of a given candidate's future task performance. If a candidate's forecasted task performance is above a minimum threshold, the candidate is accepted for at least additional evaluation and possible assignment to the task. If the candidate's forecasted task performance is below said minimum threshold, then the candidate is rejected for the task.

Modeling Example

The above systems and methods were utilized by a mid-sized organization to develop a combined screening model for sales person candidates. Task performance metric data was collected for about 25 training persons (i.e. N~25) already in the organization. The N training persons were also presented with a personality profile comprising personality and reasoning items. Responses from the N training persons were collected. Credit reports for the N training persons were also obtained. Screening items and non-screening items within said characteristic profiles were identified using linear correlations as illustrated in FIGS. 7A and 7B. Data was then read into a computer implemented modeling system and a first forward stepwise regression was done with a modeler selecting a first screening parameter as a starting point. The results are illustrated in FIG. 8A.

Figure 8A:
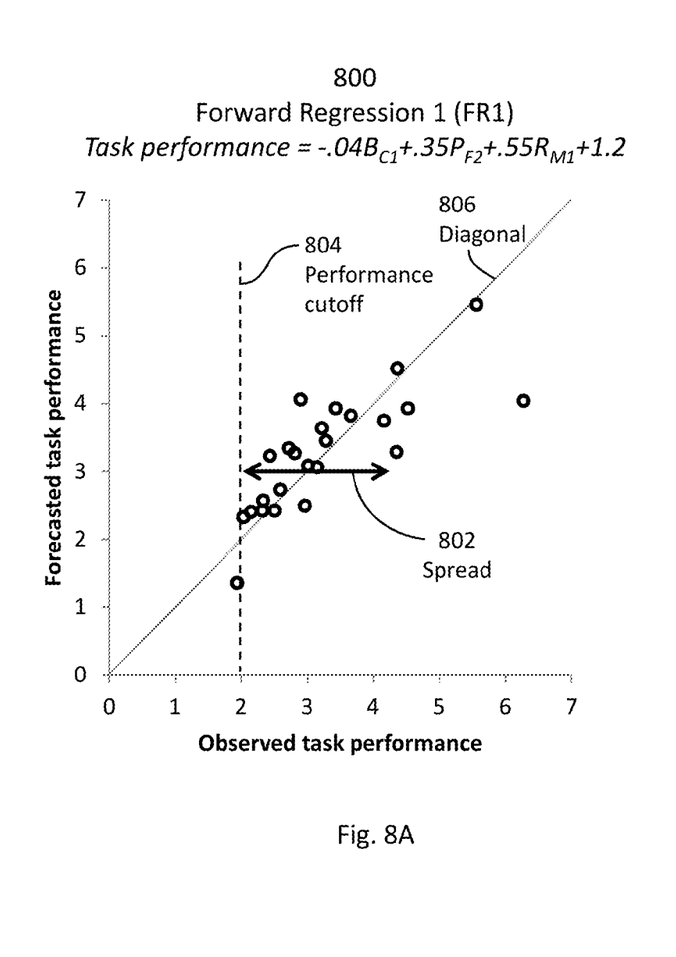
FIG. 8A is a graph of forecasted task performance versus observed task performance for a first forward stepwise regression.

FIG. 8A is a graph of forecasted task performance versus observed task performance for the N training persons. The observed task performance ranged from 2 to 7 units. There were no persons below about 2 units since that was considered a performance cutoff 804. Any persons with less than 2 units of task performance were removed from the task.

The spread 802 in the observed task performance about a diagonal line 806 in the graph 800 gives an indication of the goodness of fit between the output of the model (forecasted task performance) and the observed task performance of the N training persons. The spread is about 2 to 4 units. Thus if this model alone were used, a candidate scoring a 3 units of forecasted task performance would be expected to have an observed task performance in the range of 2 to 4 units. This spread is relatively wide. A narrow spread would give a more useful model.

In this example, the equation for the first forward stepwise regression (FR1) was:

$$\text{Task performance} = -0.04 B_{C1} + 0.35 P_{F2} + 0.55 R_{M1} + 1.2$$

where:
Task performance is the forecasted task performance;
$B_{C1}$ is a screening item from a behavior profile;
$P_{F2}$ is a screening item from a personality profile; and
$R_{M1}$ is a screening item from a reasoning profile.

$B_{C1}$ was the first screening item selected by the modeler to initiate the first forward stepwise regression. It was the most effective screening item for forecasting task performance. The other items in the model and their associated weights were determined by the forward stepwise regression program. Together $B_{C1}$, $P_{F2}$, and $R_{M1}$ form a first subset of screening items.

Figure 8B:
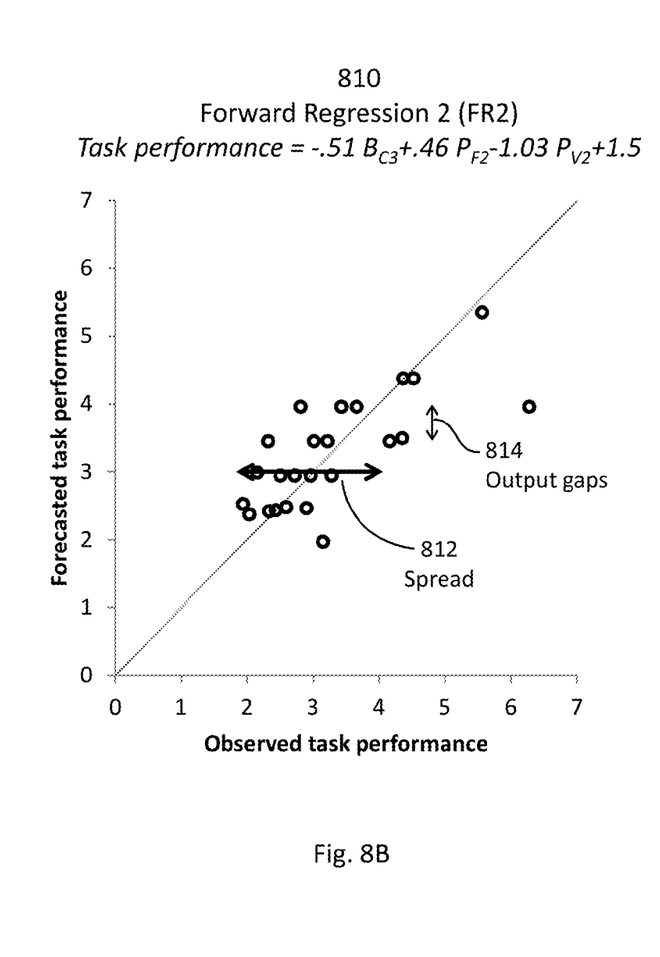
FIG. 8B is a graph of forecasted task performance versus observed task performance for a second forward stepwise regression.

FIG. 8B is a graph 810 of forecasted task performance from a second forward stepwise regression (FR2) versus the same observed task performance as in FIG. 8A. The spread 812 is about the same as for the first forward stepwise regression. The starting point for the second forward stepwise regression, however, was a second screening item, $B_{C3}$, selected by a modeler. This screening item had a coarse discretization of about 5 levels as evidenced by the output gaps 814 in the forecasted task performance. The modeling program selected a same screening item $P_{F2}$ from the N persons' personality profiles for the second forward stepwise regression but replaced the reasoning screening item $R_{M1}$ from the first regression with another personality screening item $P_{V2}$. Together $P_{F2}$, $R_{M1}$, and $P_{V2}$ form a second subset of screening items. The first subset of screening items and the second subset of screening items are different by at least one screening item. Thus there is at least some independence between the models.

Figure 9A:
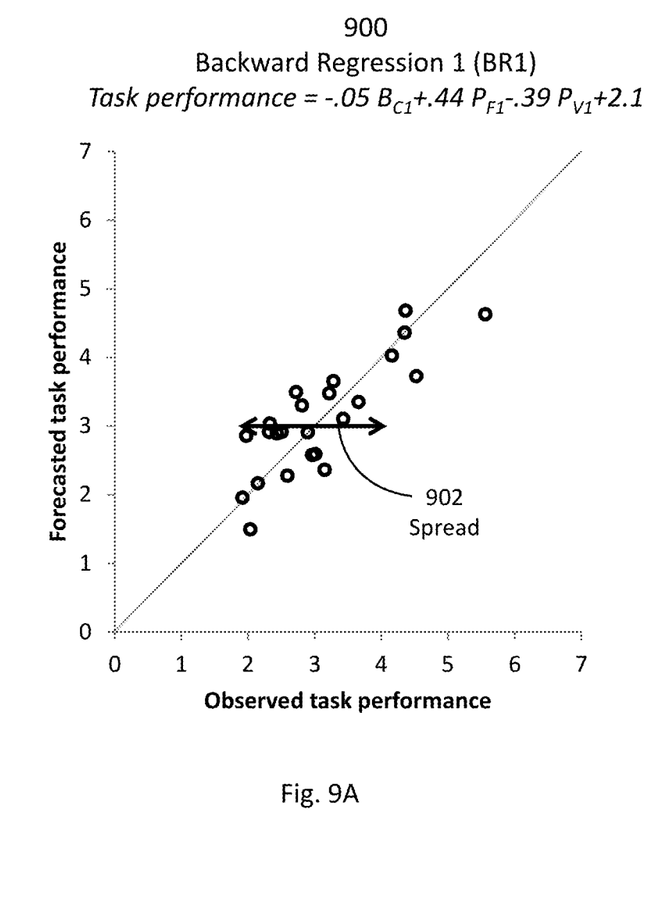
FIG. 9A is a graph of forecasted task performance versus observed task performance for a second backward stepwise regression.

For the third run of the modeling program, a backward stepwise regression (BR1) was run. FIG. 9A is a graph 900 of the results from the backward stepwise regression. The spread 902 is comparable to the two other forward stepwise regressions. Two of the personality screening items $P_{F1}$ and $P_{V1}$ were different than the personality screening items in the other two regressions. Thus each model had a subset of screening items which was different by at least one screening item than the other subsets of screening items for the other models.

Figure 9B:
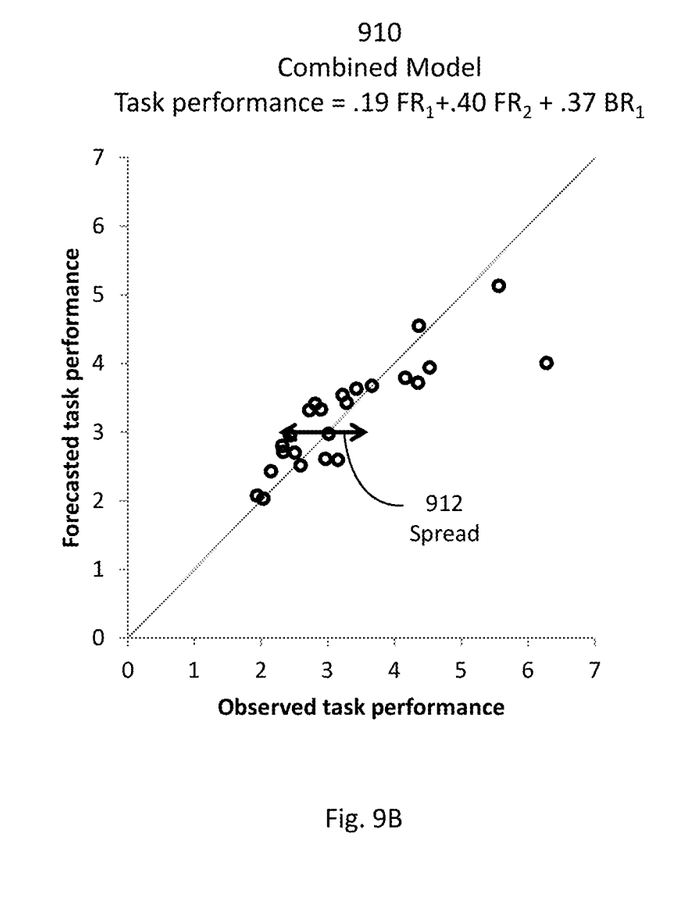
FIG. 9B is a graph of forecasted task performance versus observed task performance for a combined model.

FIG. 9B shows a graph 910 of the results when the three path dependent models were combined using a linear combination. A regression was done on the weights for each model in the linear combination to minimize the spread 912 between forecasted and observed task performance. The linear combination gives a more robust forecasted task performance that is less sensitive to small changes in the responses to the screening items. A candidate that has a forecasted task performance of a 3 for example, can be expected to have an observed task performance in the range of 2.5 to 3.5. This makes the combined model a more useful screening tool.

Candidate Screening Example

The above referenced organization used the combined model to screen new candidates for the task functions. The minimum threshold for a candidate's forecasted task performance metric was 2 units. About 32 of the candidates that met the minimum threshold were ultimately assigned to the task over the course of about a year. Each candidate went through an 8 week training period and then joined a pool of about 38 other persons who had been assigned to the task before the screening was implemented.

Figure 10:
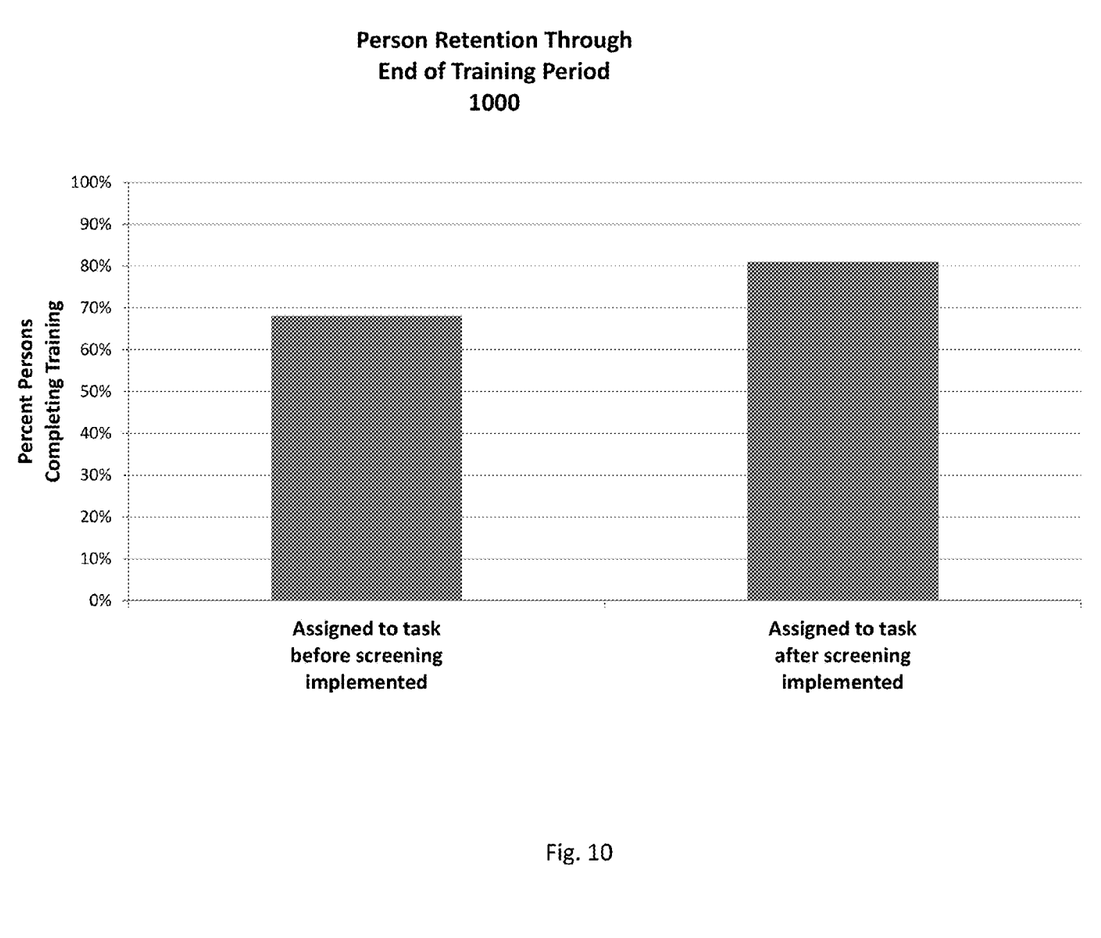
FIG. 10 shows a bar graph of person retention through the end of a training period.

FIG. 10 shows a bar graph 1000 of person retention through the end of the training period. Persons assigned to the task before the screening was implemented had had a training completion rate of about 68%. Candidates assigned to the task after the screening was implemented had a training completion rate of about 80%.

Figure 11:
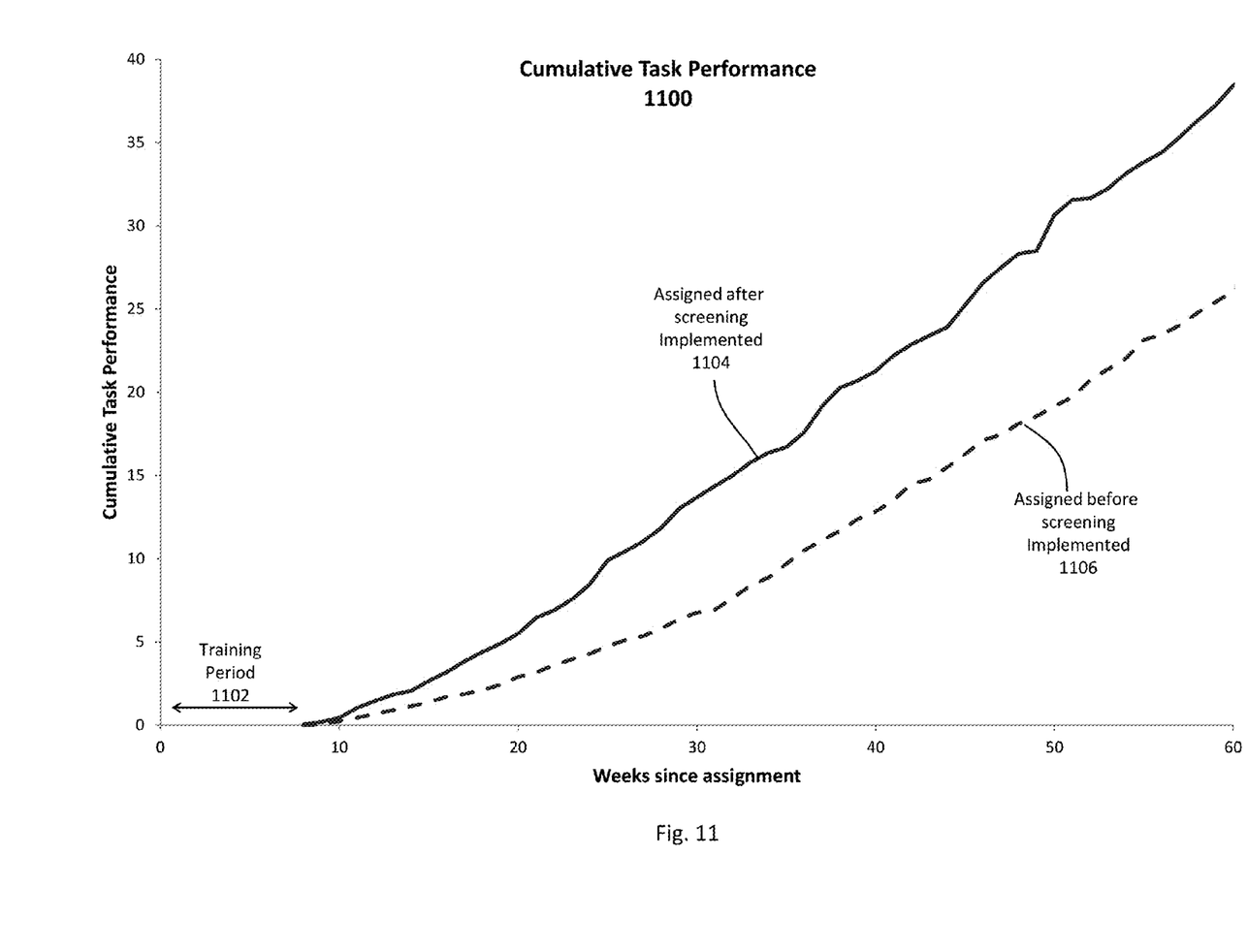
FIG. 11 shows the cumulative task performance versus time for persons assigned to a task.

FIG. 11 shows the cumulative task performance 1100 versus time for the first year of persons being assigned to the task function. By cumulative task performance, it is meant the total number of times the task was completed successfully up until a given time. The solid line 1104 is for persons who had been screened with the combined model before assignment. The dashed line 1106 is for persons who had not been screened with the combined model before assignment to the task. There were no tasks completed during the initial training period 1102. Task completions then started off slowly and increased more rapidly as persons got more experience. The total cumulative task completions for the persons assigned after screening were 60% higher at the end of their first year than for persons assigned before screening.

Alternative Embodiments

The methods and systems described herein have been with respect to screening candidates for a task. The same methods and systems can be applied to any situation where persons need to be screened for a particular task as long as there are 10 or more individuals available to build the combined model.

The modeling step can be iterated as data is obtained for additional training persons performing the task function and/or additional performance data is obtained for existing training persons.

CONCLUSION

While the disclosure has been described with reference to one or more different exemplary embodiments, it will be understood by those skilled in the art that various changes may be made and equivalents may be substituted for elements thereof without departing from the scope of the disclosure. In addition, many modifications may be made to adapt to a particular situation without departing from the essential scope or teachings thereof. Therefore, it is intended that the disclosure not be limited to the particular embodiment disclosed as the best mode contemplated for carrying out the invention.

We claim:

1. An artificial intelligence expert learning system for screening comprising:
   a) a computer implemented screening item measuring instrument comprising a measuring instrument output device and a measuring instrument input device;
   b) a task performance database comprising task performance metric data for a set of N training persons wherein said N training persons all have a same task function characterized by said task performance metric;
   c) a computer implemented modeling engine comprising a modeling engine output device and a modeling engine input device;
   d) a computer implemented screening engine comprising a screening engine output device and a screening engine input device; and
   e) a permanent memory comprising computer executable instructions to physically cause:
      i) said measuring instrument to provide a characteristic profile comprising one or more screening items and one or more non-screening items to said set of N training persons through said measuring instrument output device;
      ii) said measuring instrument to read in responses to said items from said set of N training persons through said measuring instrument input device;
      iii) said modeling engine to:
         1) read in said responses from said N training persons from said measuring instrument; and
         2) read in said task performance metric data for said N training persons from said task performance database;
      iv) said modeling engine to fit a first path dependent model of said task performance metric data using responses to a first subset of said screening items, said first path dependent model comprising not more than M parameters where M is less than or equal to N/E wherein E has a value of 5 or greater;
      v) said modeling engine to fit a second path dependent model of said task performance metric using responses to a second subset of said screening items, said second path dependent model comprising not more than M parameters, and wherein said first subset of said screening items is different than said second subset of said screening items by at least one screening item;
      vi) said modeling engine to form a linear combination of said first and second path dependent models to form a combined model;
      vii) said screening engine to read in said combined model;
      viii) said screening engine to provide said characteristic profile to a candidate for said task function through said screening engine output device;
      ix) said screening engine to receive responses to the screening items in said characteristic profile from said candidate through said screening engine input device;
      x) said screening engine to execute said combined model using said candidate responses to produce an forecasted task performance metric for said candidate; and xi) said screening engine to reject said candidate for said task when said projected task performance metric is less than a minimum threshold task performance metric.

2. The artificial intelligence expert learning system of claim 1 wherein:
   a) said task performance metric data spans a range of task performance metric data;
   b) said responses of said training persons to said characteristic profile span a domain for each item in said characteristic profile; and
   c) said permanent memory comprising computer executable instructions to physically cause:
      i) said modeling engine to characterize an item as a screening item by:
         1) fitting a linear model of said task performance metric data to said training persons' responses to each of said items;
         2) determining a range of each of said linear models over the corresponding domains of said responses to said items; and
         3) designating an item as a screening item when the range of said item's linear model is more than 10% of said range of said task performance metric data.

3. The artificial intelligence expert learning system of claim 1 wherein said first path dependent model is a forward stepwise regression model with a first screening item as its starting point and said second path dependent model is also a forward stepwise regression model but with a second screening item as its starting point wherein said first screening item and said second screening item are different.

4. The artificial intelligence expert learning system of claim 1 where said permanent memory comprising computer executable instructions to physically cause:
   a) said modeling engine presents a plurality of screening items comprising said first and said second screening item to a modeler through said modeling engine output device;
   b) said modeling engine to receive a selection of said first and said second screening items from said modeler through said modeling engine input device; and
   c) executing said fittings of said models after said receipt of said selected first and second screening items.

5. The artificial intelligence expert learning system of claim 1 wherein said threshold task performance metric is greater than the minimum of said task performance metric data for said set of N training persons.

6. The artificial intelligence expert learning system of claim 1 wherein said first path dependent model is a forward stepwise regression and said second path dependent model is a backward stepwise regression.

* * * * *